United States Patent [19]

Ishikura

[11] Patent Number: 5,195,770
[45] Date of Patent: Mar. 23, 1993

[54] RECLINING MECHANISM FOR BABY CARRIAGE

[75] Inventor: Takashi Ishikura, Tokyo, Japan

[73] Assignee: Combi Corporation, Tokyo, Japan

[21] Appl. No.: 758,974

[22] Filed: Sep. 6, 1991

[30] Foreign Application Priority Data

Sep. 20, 1990 [JP] Japan ............................... 2-98122[U]

[51] Int. Cl.$^5$ ................................................ B62B 7/12
[52] U.S. Cl. ..................... 280/648; 280/647; 280/650; 280/657; 297/61; 297/408
[58] Field of Search ...................... 280/47.38, 647, 650, 280/657, 658, 642, 648, 47.4; 297/61, 356, 377, 408, 409

[56] References Cited

U.S. PATENT DOCUMENTS

| 4,084,849 | 4/1978 | Ishida et al. | 297/377 |
| 4,538,830 | 9/1985 | Nakao et al. | 280/647 |
| 4,805,928 | 2/1989 | Nakao et al. | 280/642 |

FOREIGN PATENT DOCUMENTS

| 198802 | 10/1986 | European Pat. Off. |  |
| 233133 | 8/1987 | European Pat. Off. | 280/642 |
| 8326705 | 9/1985 | Fed. Rep. of Germany. |  |
| 63-34676 | 3/1988 | Japan. |  |
| 63-34677 | 3/1988 | Japan. |  |
| 2089292 | 6/1982 | United Kingdom. |  |

Primary Examiner—Eric D. Culbreth
Attorney, Agent, or Firm—Sughrue, Mion, Zinn, Macpeak & Seas

[57] ABSTRACT

A mechanism for reclining a back of a sitting part of a baby carriage as well as head protection plate attached to the back. The mechanism includes an engagement member disposed on a rear of the back and having a plurality of notches arranged vertically with respect to one another; a support rod pivotally coupled to opposite sides of the seat and extending across the rear of the back, the support rod being pivotable up and down with respect to the back; and a stopper attached to the support rod and having an engagement rod attached thereto which is engageable with the notches of the engagement member. The engagement rod is movable up and down along the back in correspondence with the pivotable movement of the support rod such that the back is supported at a selected position by engaging the engagement rod is one of the notches. A head protection plate is pivotally coupled to the back at a top thereof so that the plate can be pivoted up and down and a pair of side plates are respectively secured to opposite sides of the back and have an arc-shaped guide holes respectively disposed therein. Additionally, upper and lower pivots respectively project from opposite sides of the head plate for pivoting the head plate up and down, the lower pivots being pivotally coupled to the side plates near the upper ends thereof and the upper pivots being fitted in the guide holes provided in the side plates.

11 Claims, 4 Drawing Sheets

RECLINING MECHANISM FOR BABY CARRIAGE

BACKGROUND OF THE INVENTION

This application is based on and claims priority from Japanese Patent Application Hei. 2-98122 filed Sep. 20, 1990, the disclosure of which is incorporated herein.

FIELD OF THE INVENTION

The present invention relates to a mechanism for reclining the back of the sitting part of a baby carriage, and more particularly relates to a mechanism for reclining the back so that the angle of tilt of a head protection plate changes in kinematic conjunction with the change in the angle of tilt of the back

BACKGROUND

A mechanism for reclining the back of the sitting part of a baby carriage so that the back is disposed in an optimal posture for a baby, whether the baby is awake or asleep, has been disclosed in the Japanese Utility Model Application (OPI) No. 34676/88 (the term "/OPI" as used herein means an "unexamined published application"). However, the mechanism is disposed in a wide area extending from the rear of the back to the side portions of the baby carriage and, thus, is relatively complicated.

A mechanism by which a head protection plate for supporting the baby's head in the sitting part of a baby carriage can be freely pivoted up and down has been disclosed in the Japanese Utility Model Application (OPI) No. 34677/88. However, the mechanism includes a plurality of links for coupling the head protection plate to the back of the sitting part and, therefore, is also relatively complicated.

SUMMARY OF THE INVENTION

Accordingly, it is an object of the present invention to provide a mechanism for reclining the back of the sitting part of a baby carriage which has a simple design and which allows for the head protection plate to pivot up and down in kinematic conjunction with the reclining mechanism.

In the mechanism provided in accordance with the present invention, in order to recline the back of the sitting part of the baby carriage, the back is pivotally coupled at the bottom thereof to the rear portion of the seat so that the back can be pivoted up and down. Further, the head protection plate is pivotally coupled to the top portion of the back so that the head protection plate can also be pivoted up and down. The horizontal portion of a support rod is disposed at the rear of the back. The support rod is shaped as an inverted U as viewed from behind the back, and is pivotally coupled at both ends thereof to the side edges of the seat at or near the rear thereof so that the rod can be pivoted up and down. An engagement rod of a stopper is attached to the horizontal portion of the support rod so as to be pivotable up and down. The engagement rod can be fitted in a selected one of a plurality of engagement notches provided at the rear of the back at different heights. Upper and lower pivots for pivoting the head protection plate up and down project from both side edges thereof so that the pivots on each of the side edges are located in upper and lower positions at an appropriate distance from each other. The lower pivots are pivotally coupled to the upper ends of side plates disposed at the side edges of the back. Further, the upper pivots are fitted in sliding guide holes provided in the side plates and each shaped as an arc.

BRIEF DESCRIPTION OF THE DRAWINGS

The drawings show a mechanism which is an embodiment of the present device and is for reclining the back of the sitting part of a baby carriage.

Figure 1:
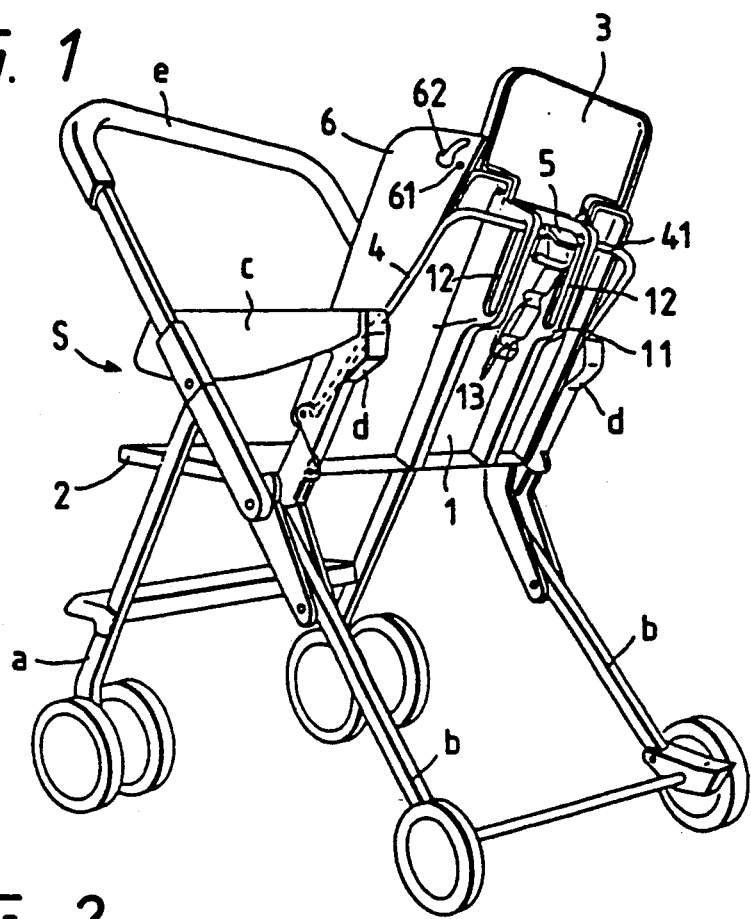
FIG. 1 is perspective view of the carriage with the mechanism.

DETAILED DESCRIPTION OF THE PREFERRED EMBODIMENT hereafter described with reference to the drawings attached hereto.

FIGS. 1-7 illustrate a preferred embodiment for reclining the back 1 of the sitting portion of a baby carriage 5. The baby carriage 5 is conventional in constitution, and includes front legs a, rear legs b, support rods d, a handle e, and the sitting portion. The front and rear leg a and b are pivotally supported at upper ends thereof near the front ends of the armrests c of the sitting portion which are pivotally coupled at the rear ends thereof to the upper ends of the support rods d. The support rods d extend up from the intermediate portions of the rear legs b. The handle e is pivotally coupled at both ends thereof to the appropriate portions of the rear legs b so that the handle can be optionally pivoted backward into a first position behind a baby in the sitting portion of the carriage and forward into a second position in front of the baby.

The sitting portion of the baby carriage 5 includes a back 1, a seat 2, a head protection plate 3, and side plates 6. The back 1 is pivotally coupled to the seat 2 at the rear thereof so that the back can be pivoted up and down. The head protection plate 3 is pivotally coupled at the bottom thereof to the back 1 at the upper edge thereof so that the plate can likewise be pivoted up and down.

The reclining mechanism includes a support rod 4, a stopper 5, two sliding guide plates 11, and a pair of engagement members having engagement notches 13. The sliding guide plates 11 extend vertically and are horizontally displaced from one another on the rear of back 1. The stopper 5 is attached to the central part of horizontal portion 41 of the support rod 4 so that the stopper can be pivoted up and down. The sliding guide plates 11 have sliding holes 12 in which the horizontal portion 41 of the support rod 4 is slidably fitted. The engagement notches 13 are provided at different heights between the sliding guide plates 11 so that the engagement rod 53 of the stopper 5 can be fitted in a selected pair of the notches. The distance from the rear of the back 1 to the inner edge of each of the sliding holes 12 is designed not to be smaller than the distance from the rear of the back to the outer edge of each of the engagement notches 13, so that the engagement members in which the notches are disposed do not hinder the support rod 4 from being slid in the sliding holes 12 of the sliding guide plates 11.

The support rod 4 has an inverted U shape when viewed from behind the back 1 of the sitting portion of the baby carriage 5. The back 1 is supported at the rear thereof by the combination of stopper 5, the engagement members and the support rod 4 so that the back is kept at a desired reclined angle. The horizontal portion 41 of the support rod 4 is fitted in the sliding holes 12 of the sliding guide plates 11. The support rod 4 is pivotally coupled at both the ends thereof to the lower ends of the support rods d which extend from the armrest bars c to the rear leg rods b.

Figure 4:
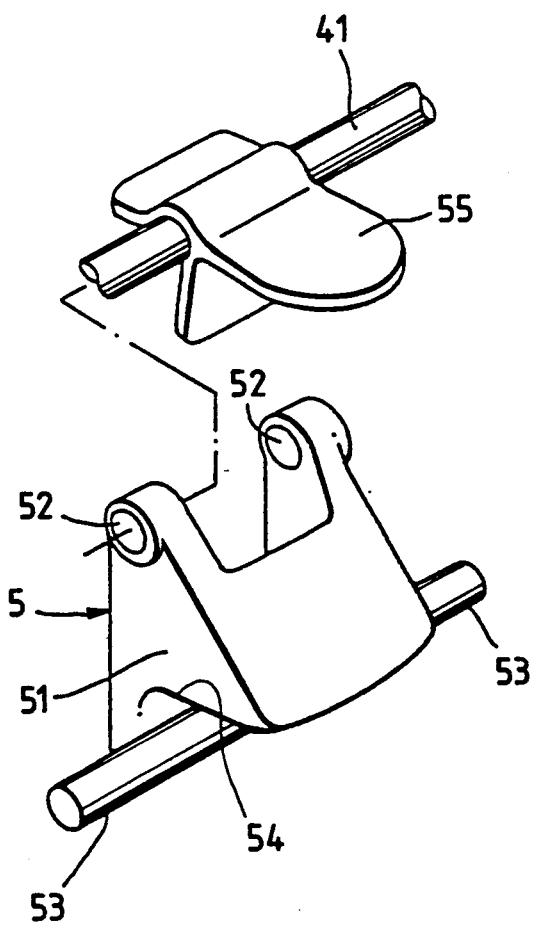
FIG. 4 is a perspective, exploded view of the stopper of the mechanism.
Figure 6:
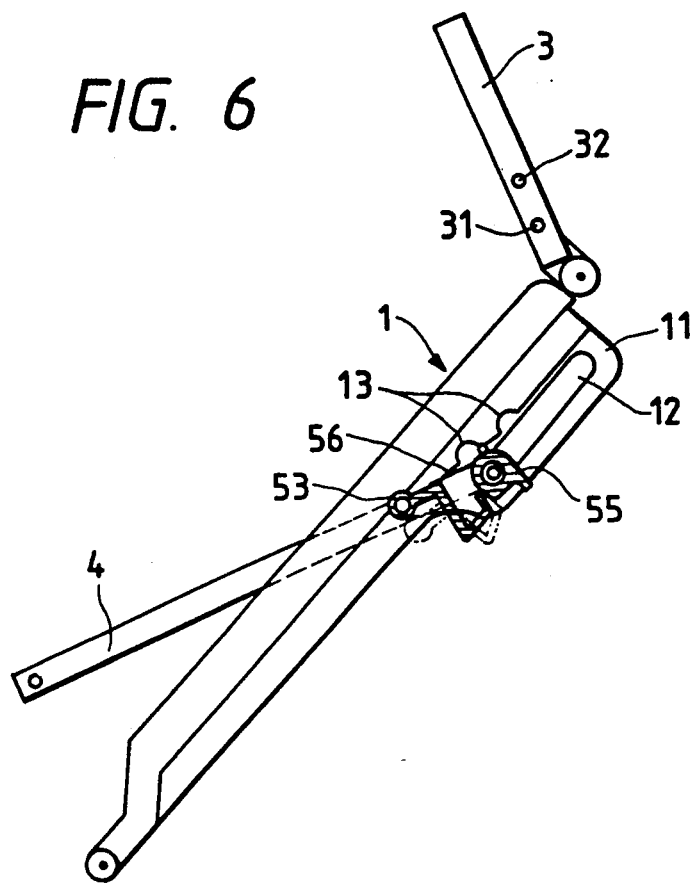
FIG. 6 is a side view of the back where the side plate is not shown.

The stopper 5 is attached to the central part of the horizontal portion 41 of the support rod 4 so that the stopper can be pivoted up and down. Specifically, the body 51 of the stopper 5 is appropriately dimensioned in width and length and has holes 52 at the butt of the body, as shown in FIG. 4. The horizontal portion 41 extends through the holes 52. The engagement rod 53 of the stopper 5 extends parallel to the horizontal portion 41, and is fitted at opposite ends thereof in the selected pair of the engagement notches 13. The stopper body 51 has a finger engagement portion 54 and a thumb engagement plate 55 of the stopper 5 is secured to the horizontal portion 41. To pivot the stopper 5 either up or down, the stopper is grasped by placing the thumb of a hand on the thumb engagement plate 55 and the index finger on the finger engagement portion 54. As shown in FIG. 6, a return spring 56 is anchored to the stopper body 51 and the thumb engagement plate 55 to apply a compressive force of the spring to them in such directions as to urge the engagement rod 53 of the stopper 5 in the engagement notches 13. To disengage the engagement rod 53 from the notches, the thumb plate 55 and finger engagement portion are urged toward each other to overcome the spring force.

Although the two engagement members having the engagement notches 13 are provided on the rear of the back 1, the present device is not confined thereto. For example, only one engagement member having engagement notches may be provided on the rear of the back, or engagement notches may be provided in the sliding guide plates 11 at the lower edges of the sliding holes 12.

The side plates 6 are disposed along the side edges of the back 1, and are pivotally coupled at the lower ends thereof to the lower ends of support rods d so that the lower ends of the side plates are not displaced when the back 1 is pivoted up and down. The support rods d support the armrests c at the rear ends thereof. However, the present device is not confined to the above-mentioned disposition of the side plates 6. For example, the side plates 6 may be pivotally coupled at the lower ends thereof to the seat 2 at the side edges thereof near the rear thereof and slightly in front of the pivotal joints of the seat and the back 1.

Figure 2:
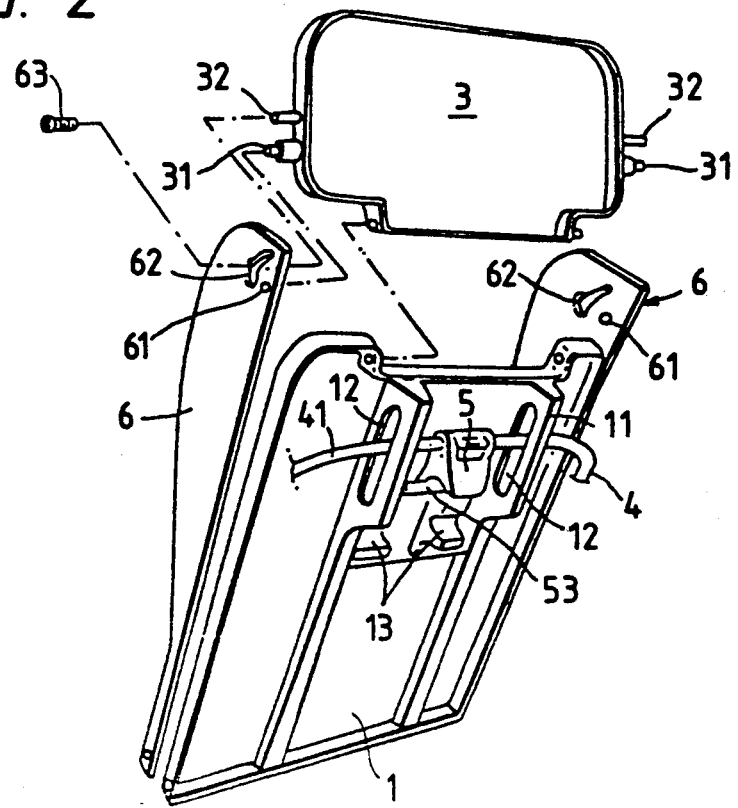
FIG. 2 is a perspective, exploded view of the back, head protection plate and side plates of the carriage.
Figure 3:
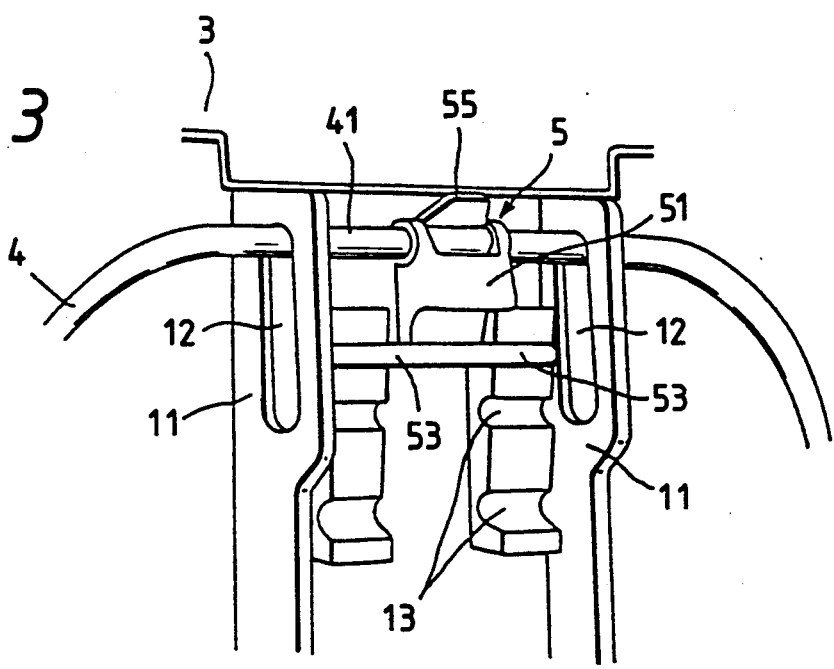
FIG. 3 is a perspective view of a primary part of the mechanism.
Figure 5:
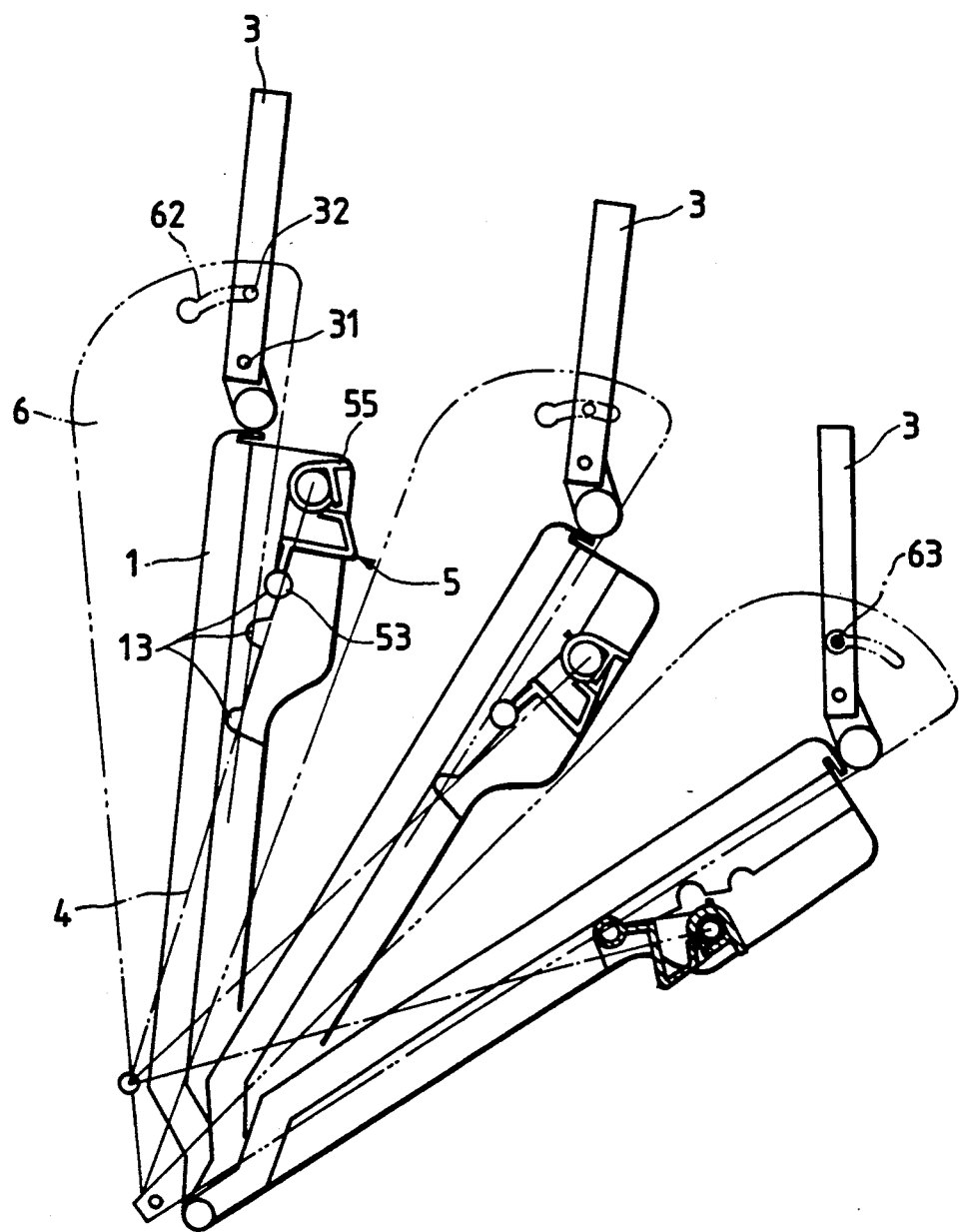
FIG. 5 is a side view of the mechanism to illustrate the positional relationship between the back, the head protection plate and the side plate in the operation of the mechanism.

Referring to FIG. 2, lower pivots 31 project horizontally sideward from the side portions of the head protection plate 3 slightly above the lower ends of the side portions, and are rotatably fitted in holes 61 provided in the side plates 6 near the upper ends thereof so that the head protection plate can be pivoted up and down. Additionally, upper pivots 32 project horizontally sideward from the side portions of the head protection plate 3 in parallel with the lower pivots 31 at an appropriate distance up therefrom. Screws 63 for preventing the side plates 6 from opening sideward away from each other are secured to the upper pivots 32. The pivots 32 extend through the arc-shaped sliding holes 62 of the side plates 6 so that the tip portions of the pivots are exposed in the holes. The screws 63, the head of each of which has a diameter larger than the width of the sliding hole 62, are tightened to the tip portions of the upper pivots 32 so that the side plates 6 are prevented from moving sideward away from each other. Each sliding holes 62 is shaped as an arc depending on the angle of the upward and downward rotation of the head protection plate 3 so that the pivot 32 is stopped at the front end of the hole when the back 1 is pivoted down and that the pivot is stopped at the rear end of the hole when the back is pivoted up, as shown in FIG. 5

Figure 7:
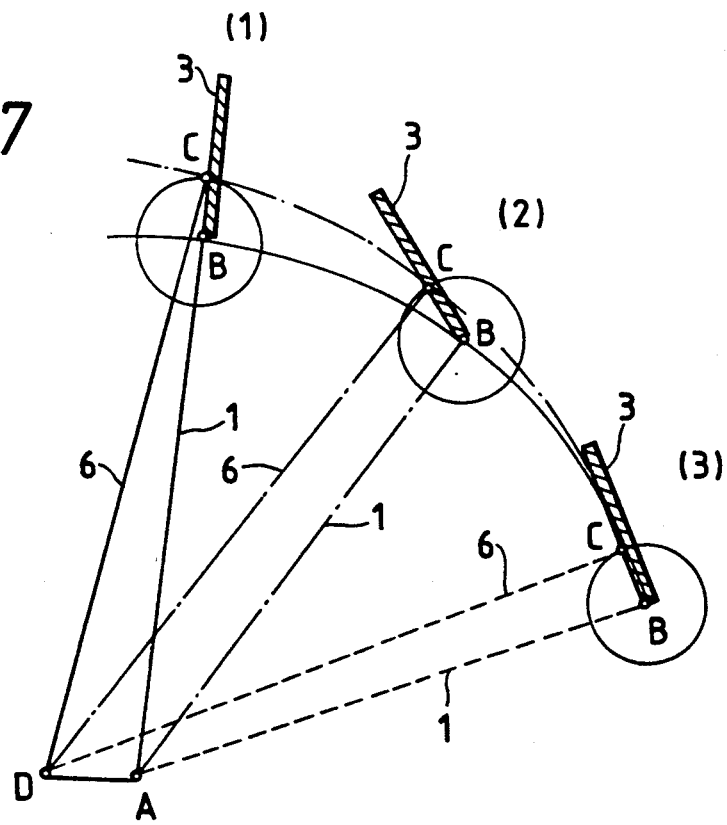
FIG. 7 is a perspective view illustrating the changes in angles defined by the pivotally coupled points of the back, the head protection plate and the side plate.

The pivoting of the head protection plate 3 up and down is based on the following principle. Referring to FIG. 7, the plate 3 is pivoted up and down along with the deformation of a geometrical figure defined by four points: a first pivotal coupling point A about which the bottom of the back 1 is pivotally coupled to the seat 2 at the rear thereof so as not to move relative thereto; a second pivotal coupling point B on which the bottom of the head protection plate 3 is pivotally coupled to the back; a third pivotal coupling point C on which the lower pivot 31 is pivotally coupled to the side plate 6 at the upper end thereof; and a fourth pivotal coupling point D on which the lower end of the side plate is pivotally coupled to the support rod d at the rear end thereof so as not to move relative thereto.

When the back 1 is pivoted up, the pivotal coupling points A, B and C are aligned in a straight line and the geometrical figure defined by points A-D forms a triangle whose vertices are disposed at points A, C and D, as shown at (1) in FIG. 7. When a straight line AB extending between the pivotal coupling points A and B and corresponding to the back 1 is slightly tilted as the back is rotated down from the upright position thereof to be reclined, another straight line DC extending between pivotal coupling points D and C is also tilted in conjunction with the tilting of the line AB.

As a result, the angle between a straight line BC and line DC and the angle between the line DC and a straight line AD extending on the pivotal coupling points A and D are altered. Accordingly, the pivotal coupling points A, B and C, having been disposed in a straight line as shown at (1) in FIG. 7, are relocated relative to each other to define a prescribed interior angle for the figure. Additionally, the pivotal coupling points B, C and D are also relocated relative to each other to define a different angle for the figure. When the straight line AB is then tilted further as shown at (2) in FIG. 7, the straight line BC is tilted in conjunction with the tilting of the former so that the head protection plate 3 is slightly rotated down. When the straight line AB is further tilted, the angle between the straight lines AB and BC is further decreased so that the line BC corresponding to the head protection plate 3 is rotated further downwardly, as shown at (3) in FIG. 7.

The operation of the mechanism is described in detail as follows.

(1) The back 1 is reclined as follows:
  (a) When the back 1 positioned upright as shown in FIG. 1 is to be reclined, the finger engagement portion 54 of the stopper 5, attached to the central portion 41 of the support rod 4 so as to be rotatable up and down, is lifted with a finger on the finger engagement portion so that the engagement rod 53 of the stopper is disengaged from the engagement notches 13.

(b) The back 1 is pivoted down to a desired reclination angle while the engagement rod 53 is maintained disengaged from the notches 13 and the back is supported at the upper portion thereof.

(c) Thereafter, the finger is removed from the finger engagement portion 54 of the stopper 5 so that the engagement rod 53 of the stopper is engaged in another engagement notches 13 to keep the back 1 at the desired reclination angle.

(d) To shift the back 1 to another reclination angle, steps similar to (a), (b) and (c) are repeated.

(2) When the back 1 is rotated up and down as described in the section (1), the head protection plate 3 coupled to the back is automatically pivoted up and down as follows:

(a) When the back 1, corresponding to the straight line AB, is pivoted down to be reclined, the side plates 6 corresponding to the straight line CD are tilted in the same direction as the back in kinematic conjunction therewith.

(b) As the side plates 6 are pivoted downwardly, the angle of 180 degrees between the straight lines AB and BC changes to a smaller angle so that the head protection plate 3 is rotated up, namely, it is rotated up relative to the surface of the back 1, as shown at (2) and (3) in FIG. 7.

The mechanism which is the embodiment of the present device produces desirable effects as follows:

(1) The mechanism provided at the of back 1 is much simpler in design than a conventional mechanism and has a better appearance than the latter. Since the mechanism for pivoting the head protection plate 3 up and down is simplified, the costs of assembly and production of the mechanism is significantly reduced.

(2) The back 1 can be safely reclined through a very simple operation where the stopper 5, attached to the horizontal portion 41 of the support rod 4 shaped as inverted U, is rotated.

(3) The mechanism for automatically pivoting the head protection plate 3 up and down as the back 1, coupled at the top thereof to the plate, is pivoted up and down is a simple in design such that the pivots 31 and 32 for rotating the plate project from the side portions of the plate and are respectively fitted in the holes 61 and the sliding guide holes 62 provided in the side plates 6 at the upper ends thereof. Because of this construction, the mechanism does not project from the baby carriage A and the reclining mechanism, so that the mechanism for pivoting the head protection plate 3 up and down is safe and aesthetically attractive.

What is claimed is:

1. A mechanism for reclining a back of a baby carriage including a seat upon which said baby sits and to which said back is pivotally attached, said mechanism comprising:

an engagement member disposed on a rear of said back and having a plurality of notches arranged vertically with respect to one another;

a substantially U-shaped rod extending across the rear of said back, said support rod being pivotable up and down with respect to said back wherein said support rod is pivotally coupled at both the ends thereof to sides of said carriage;

a stopper rotatably attached to said support rod, said stopper further including an engagement rod attached thereto which is engageable with said notches of said engagement member, said engagement rod being movable up and down along said back in correspondence with the pivotable movement of said support rod when said stopper is rotated wherein said back is supported at a selected position by engaging said engagement rod in one of said notches;

a head protection plate pivotally coupled to said back at a top thereof so that said head protection plate can be pivoted up and down; and head plate pivot means for causing said head protection plate to pivot up and down in response to up and down pivotal movement of said back.

2. The mechanism according to claim 1, further comprising a biasing means for normally biasing said engagement rod of said stopper to engage with said notches of said engagement member.

3. The mechanism according to claim 1, further comprising armrest support bars extending from rear legs of said carriage to armrests of said carriage for supporting said armrests.

4. The mechanism of claim 1 wherein said head plate pivot means comprises:

a pair of side plates respectively pivotally secured about a first pivot point at a bottom portion thereof to said carriage, said first pivot point being displaced forward of a second pivot point attaching said back to said seat such that said first pivot point is not displaced when said back is pivoted, said side plates having arc-shaped guide holes respectively disposed therein;

upper and lower pivots respectively projecting from opposite sides of said head plate for pivoting said head plate up and down, said pivots being located in upper and lower positions at a predetermined distance from each other, said lower pivots being pivotally coupled to said side plates near upper ends thereof and said upper pivots being fitted in said guide holes provided in said side plates.

5. The mechanism of claim 4 wherein said side plates are pivotally secured to said armrest support bars.

6. A mechanism for reclining a back of a baby carriage including a seat upon which said baby sits and to which said back is pivotally attached, said mechanism comprising:

an engagement member disposed on a rear of said back and having a plurality of notches arranged vertically with respect to one another;

a substantially U-shaped support rod extending across the rear of said back, said support rod being pivotable up and down with respect to said back wherein said support rod is pivotally coupled at both the ends thereof to said sides seat carriage near;

a stopper attached to said support rod and having an engagement rod attached thereto which is engageable with said notches of said engagement member, said engagement rod being movable up and down along said back in correspondence with the pivotable movement of said support rod wherein said back is supported at a selected position by engaging said engagement rod in one of said notches;

a head protection plate pivotally coupled to said back at a top thereof so that said head protection plate can be pivoted up and down;

head plate pivot means for causing said head protection plate to pivot up and down in response to up and down pivotal movement of said back wherein said head plate pivot means comprises:

a pair of side plates respectively and pivotally secured about a first pivot point at a bottom portion thereof to said carriage, said first pivot point being displaced forward of a second pivot point attaching said back to said seat such that said first pivot point is not displaced when said back is pivoted, said side plates having arc-shaped guide holes respectively disposed therein;

upper and lower pivots respectively projecting from opposite sides of said head plate for pivoting said head plate up and down, said pivots being located in upper and lower positions at a predetermined distance from each other, said lower pivots being pivotally coupled to said side plates near upper ends thereof and said upper pivots being fitted in said guide holes provided in said side plates.

7. The mechanism of claim 6 wherein said side plates are pivotally secured to said armrest support bars.

8. A mechanism for reclining a head protection plate of a baby carriage, which is pivotally coupled to a back of said carriage, in correspondence with reclining said back, which is pivotally connected to a seat of said carriage, comprising:

a pair of side plates respectively and pivotally secured about a first pivot point at a bottom portion thereof to said carriage in such a manner that said first pivot point is not displaced when said back is pivoted relative to said seat about a second pivot point, said side plates having arc-shaped guide holes respectively disposed therein; and upper and lower pivots respectively projecting from opposite sides of said head plate for pivoting said head plate up and down, said pivots being located in upper and lower positions at a predetermined distance from each other, said lower pivots being pivotally coupled to said side plates near upper ends thereof and said upper pivots being fitted in said guide holes provided in said side plates.

9. The mechanism of claim 8 wherein said first pivot point is disposed forward of said second pivot point.

10. The mechanism according to the claim 9, wherein said side plates are pivotally coupled at lower ends thereof opposite sides of said seat near a rear portion of said seat.

11. The mechanism according to the claim 9, further comprising a pair of support rods an armrest bars, said support rods supporting said armrest bars at a rear end thereof, and wherein said side plates are pivotally coupled at the lower ends thereof to said support rods.

* * * * *